United States Patent [19]

Suzuki et al.

[11] Patent Number: 5,506,703
[45] Date of Patent: Apr. 9, 1996

[54] THREE-DIMENSIONAL IMAGE DISPLAY DEVICE

[75] Inventors: Toru Suzuki; Hideyuki Wakai; Manabu Ando; Kiyokazu Mizoguchi; Keiji Terada; Masato Moriya; Koji Shio, all of Hiratsuka, Japan

[73] Assignee: Kabushiki Kaisha Komatsu Seisakusho, Tokyo, Japan

[21] Appl. No.: 197,305

[22] Filed: Feb. 16, 1994

[30] Foreign Application Priority Data

Feb. 17, 1993 [JP] Japan .................................. 5-028177

[51] Int. Cl.$^6$ ............................ G02B 5/32; G02B 26/10; G02B 27/22; G03H 1/22
[52] U.S. Cl. .................... 359/17; 359/18; 359/32; 359/33; 359/478
[58] Field of Search ........................... 359/17, 18, 19, 359/20, 32, 33, 478, 479

[56] References Cited

U.S. PATENT DOCUMENTS

| | | | |
|---|---|---|---|
| 3,619,033 | 11/1971 | McMahon | 359/18 |
| 3,795,768 | 3/1974 | Locke | 359/18 |
| 4,333,006 | 6/1982 | Gorin et al. | 359/18 |
| 4,580,151 | 4/1986 | Bamba | 359/18 |
| 4,591,242 | 5/1986 | Broockman et al. | 359/17 |
| 4,593,967 | 6/1986 | Haugen | 359/18 |
| 4,830,443 | 5/1989 | Hecker et al. | 359/18 |
| 5,295,004 | 3/1994 | Hasegawa et al. | 359/18 |
| 5,309,244 | 5/1994 | Katagiri et al. | 359/17 |
| 5,418,632 | 5/1995 | Anderson | 359/18 |
| 5,430,560 | 7/1995 | Wakai et al. | 359/18 |

OTHER PUBLICATIONS

"Electronic display system for computational holygraphy", SPIE vol. 1212 Practical Holography IV (1990), pp. 174 to 182, St. Hilaire et al.

"A Real–Time Autosteroscopic Multiplanar 3D Display System" SID Digest, Williams et al, 1988, pp. 91 to 94.

*Primary Examiner*—Martin Lerner
*Attorney, Agent, or Firm*—Diller, Ramik & Wight

[57] ABSTRACT

A three-dimensional image display device which comprises a holographic plate having a plurality of holograms divided in correspondence with rotational angles, the holographic plate being exposed so that when light is irradiated, each of the holograms forms a point image at a different position in a depth direction of the holographic plate; a drive unit for rotating the holographic plate; a light irradiating unit including a plurality of light sources arranged substantially in a straight line so that the light sources are kept at substantially equal distances from the holographic plate, for irradiating the holographic plate with light from the light sources; and a controller for controlling the drive unit and lighting operations of the plurality of light sources of the light irradiating unit in accordance with a signal indicative of a three-dimensional image to be displayed so as to control lighting of a plurality of point images formed in a three-dimensional space, whereby a three-dimensional image can be obtained with a simple configuration.

6 Claims, 6 Drawing Sheets

THREE-DIMENSIONAL IMAGE DISPLAY DEVICE

BACKGROUND OF THE INVENTION

1. Field of the Invention

This invention relates to a three-dimensional image display device for displaying a still or a motion solid image with use of a hologram.

2. Description of the Related Art

Mechanical CADs usually use a three-side figure (e.g., third angle projection) or two-dimensional projection to display the shape of a three-dimensional object, etc. It is, however, rather difficult to recognize a complicated shape accurately from a two-dimensional projected image. In three-dimensional computer graphics, in order to observe an object in various directions, an image must be rotated on a display screen and hence it is difficult to grasp the whole image spatially.

A three-dimensional solid image is more preferable than a two-dimensional image to visualize a result of simulation of fluid or to display shapes of bones and blood vessels on the basis of an ultrasonic diagnosis image or a CT (Computed Tomography) image. The formation of a motion solid image is desired to obtain an ambience even in the field of solid picture images.

Conventionally, a stereo-pair display process has been used usually to display a three-dimensional solid image. The stereo-pair display process is to provide separate images for viewer's right and left eyes to obtain a depth. When the viewer observes two objects different in depth with the both eyes, the positions of the two object images formed on the retinas of his right and left eyes deviate in proportion to the difference in distance between the objects. This quantity of deviation between the object images seen by the both eyes is called a binocular parallax. By displaying two motion or still images containing information of the binocular parallax and using a pair of special purpose glasses which utilizes a difference in color or polarization and a special display screen including an array of micro optical elements, only image components corresponding to the right and left eyes can be separately observed, and a solid space can be reproduced in front and rear directions of the screen.

The stereo-pair display process, however, reproduces a space on the basis of the binocular parallax created when observed from one direction. Thus, there are the following problems:

1) Due to lack of information from other directions, variations of the image in different observation positions are not seen;
2) Focus adjustment cannot be made on an object desired to be seen from the viewer;
3) Since the position of the image reconstruction differs from the screen, the focus adjustment becomes a process which is not encountered in daily life; and
4) Since the images viewed with the right and left eyes are different, a sensation of incongruity is felt.

A holographic display has recently been marked as means for solving such problems.

The holography is a technique for storing and reproducing both the amplitude and phase of an optical wave, so that even when a view point is moved in up-and-down or right-and-left directions, a three-dimensional image from different angles can be seen. Since the binocular parallax, jamming, and eye adjustment which are all physiological factors with which a person recognizes a solid hold, the three-dimensional image becomes more natural than that obtained by the other methods. A hologram is produced by allowing optical wave called object light from an object to interfere with different optical wave called reference light coming from a different direction and storing interference fringes occurred as a result of interference. When the reference light enters into the hologram, the reference light is diffracted by the interference fringes in the hologram resulting in formation of the same wave front as the original object light, whereby an object image appears in the space.

However, the conventional holographic display requires one hologram for one subject (one image). Thus, in the case of a solid or a stereoscopic image of one image (still image), even though its stereoscopicness is very high, a large amount of holograms are required and the device structure becomes very complicated when a motion image is displayed.

The conventional hologram has the problem that an observable visual field angle is narrow and thus the number of people who can observe at the same time is limited to less than the several persons.

SUMMARY OF THE INVENTION

This invention is made in view of such circumstances. It is an object of the present invention to provide a simple-structured three-dimensional image display device capable of obtaining a three-dimensional image with use of holograms.

It is another object of the present invention to provide a three-dimensional image display device in which a displayed holographic image is observable from any direction in a range of 360 degrees.

In accordance with an aspect of the present invention, there is provided a three-dimensional image display device which comprises: a holographic plate having a plurality of holograms divided in correspondence with rotational angles, the holographic plate being exposed so that when the light is irradiated, each of the holograms forms a point image at a different position in a depth direction of the holographic plate; drive means for rotating the holographic plate; light irradiating means including a plurality of light sources arranged in a substantially straight line so that the light sources are disposed at substantially equal distances from the holographic plate; and control means for controlling the drive means and lighting operation of the plurality of light sources of the light irradiating means in accordance with a signal indicative of a three-dimensional image to be displayed so as to control lighting of a plurality of point images formed in a three-dimensional space.

According to the present invention, by controlling the lighting timing of the respective light sources of the light irradiating means in accordance with the rotational angle of the hologram, control of coordinates in an x direction perpendicular to a depth direction of the holographic plate (in a z direction) and to a direction of arrangement of the light sources (in a y direction) is carried out, by controlling lighting operations of the plurality of light sources, control of coordinates in the y direction is carried out, and by selectively controlling the plurality of holograms by controlling the drive means, control of coordinates in the z direction is carried out, to thereby reproduce a plurality of point images in the three-dimensional space in accordance with the image signal. Thus, by lighting a plurality of point images in the after-image time of a person, a three-dimensional solid image is observed by the eyesight of the person. Further, by moving an image to be created in units of the after-image time, a motion image can be obtained.

As described above, according to the present invention, the rotation of the hologram and the lighting operations of the plurality of light sources are controlled to control the lighting of the respective point images in the three-dimensional space in accordance with the image signal. Thus, various three-dimensional images can be displayed with a small number of holograms and a simple structure for the controls.

In accordance with another aspect of the present invention, there is provided a three-dimensional image display device which comprises: a holographic plate having a plurality of holograms divided in correspondence with rotational angles, the holographic plate being exposed so that when the light is irradiated, each of the holograms forms a point image at a different position in a depth direction of the holographic plate; drive means for rotating the holographic plate; light irradiating means including a plurality of light source modules arranged radially, each module including a plurality of light sources arranged in a substantially straight line so that the light sources are disposed at substantially equal distances from the holographic plate; and control means for controlling the drive means and lighting operations of the light sources of the plurality of light source modules of the light irradiating means in accordance with a signal indicative of a three-dimensional image to be displayed so as to control lighting of a plurality of point images formed in a three-dimensional space.

According to such structure of the present invention, the light source modules each including a plurality of light sources are arranged radially such that the holographic plate divided into a plurality of holograms is irradiated with light from the respective light sources of each light source module in correspondence to the rotational angle of the holographic plate. The rotation of the holographic plate and the respective lighting operations of the light sources of each of the light source modules are controlled in accordance with a signal indicative of a three-dimensional image to be displayed so as to display the three-dimensional image in an image space observable in any direction in a range of 360 degrees.

DESCRIPTION OF THE PREFERRED EMBODIMENTS

The present invention will be described below in detail in terms of embodiments thereof shown in the accompanying drawings.

Figure 1:
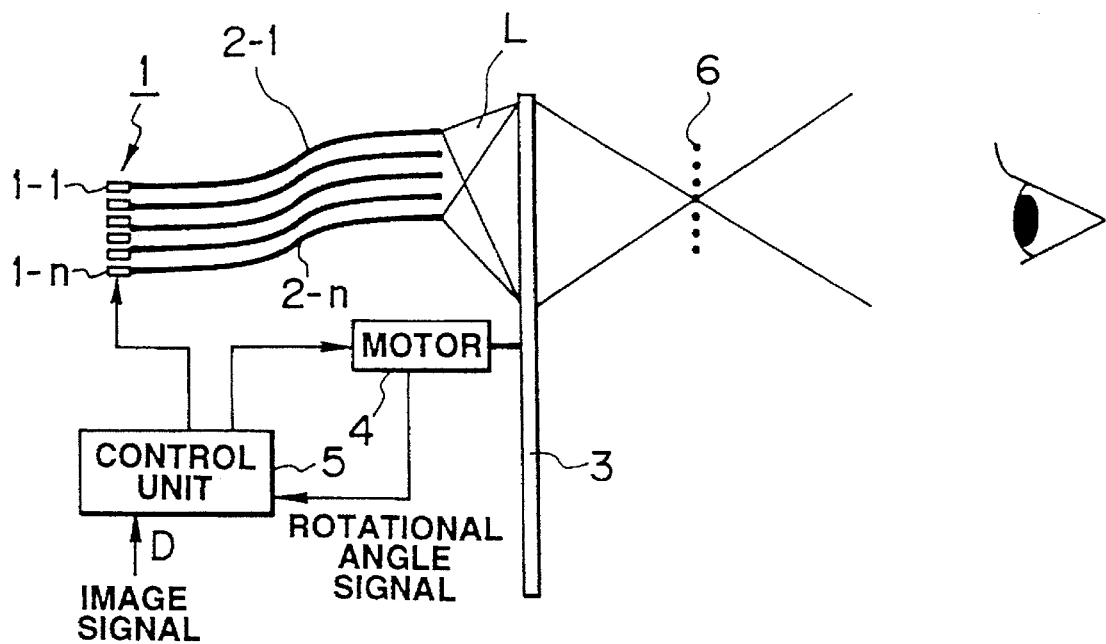
FIG. 1 shows a first embodiment of the present invention.

FIG. 1 shows a first embodiment of the present invention. In FIG. 1, laser light L emitted from a light irradiation unit 1 which includes a plurality of light sources (for example, laser light sources) 1-1, 1-2, . . . , 1-n enters through a plurality of waveguides 2-1, 2-2, . . . , 2-n (for example, of an optical fiber) provided for each of the plurality of light sources 1-1, 1-2, . . . , 1-n into a predetermined area of a hologram disc 3 . When the light irradiating unit 1 is disposed in the vicinity of the hologram disc 3, no waveguides 2-1, 2-2, . . . , 2-n are required.

The hologram disc 3 is arranged to be rotated by a motor 4 and a rotational angle signal enters into a control unit 5. The control unit 5 further receives an image signal D and controls the rotation of the motor 4 and the lighting operations of the plurality of light sources 1-1, 1-2, . . . , 1-m in accordance with the input image signal D and the rotational angle signal of the motor 4.

Figure 2:
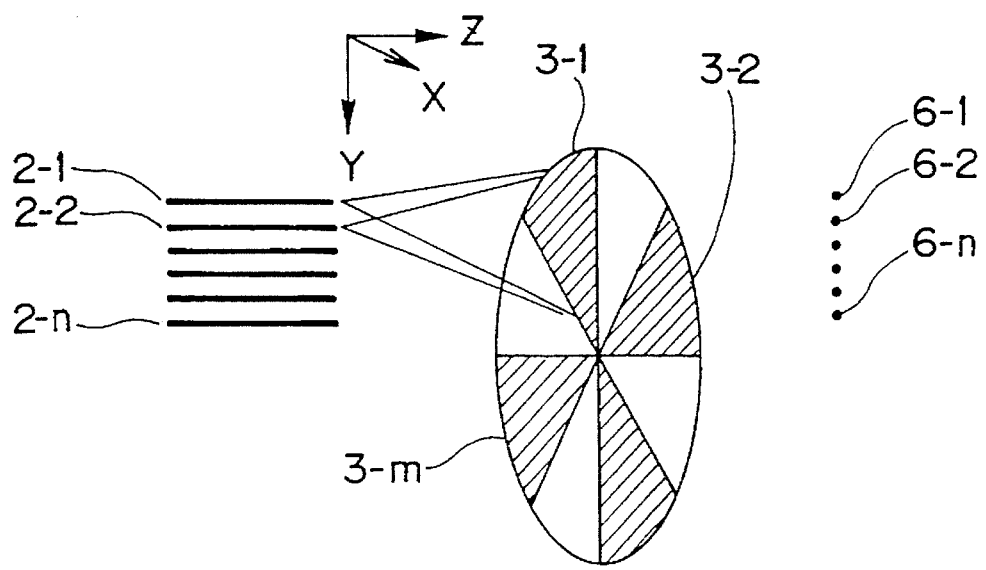
FIG. 2 illustrates the principle of point image selection in the y direction in accordance with the first embodiment.

In this case, as shown in FIG. 2, the hologram disc 3 uses a plurality of fan-shaped holograms 3-1, 3-2, . . . , 3-m bonded to a disc. In order to prevent simultaneous reconstruction of the image of two or more holograms by one light source, the holograms 3-1, 3-2, . . . , 3-m are spaced apart with each other so that one is not adjacent to another. The waveguides 2-1, 2-2, . . . , 2-n which guide light from the light irradiating unit 1 are arranged in a straight line in a y direction.

Figure 3:
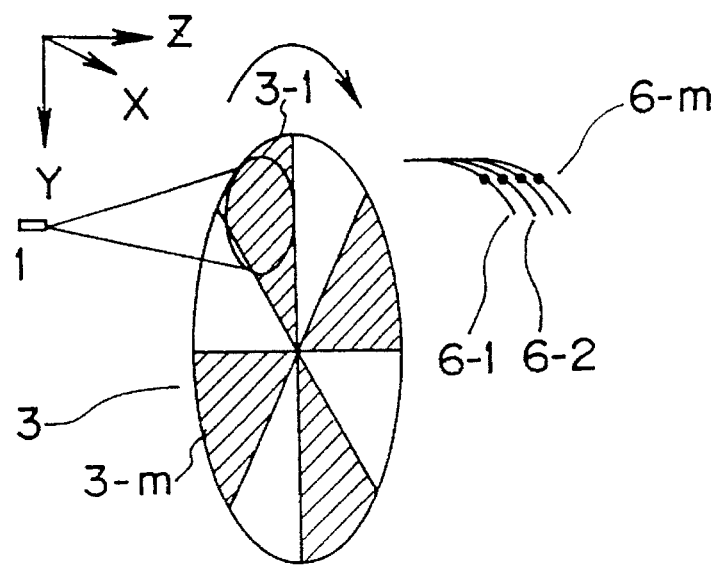
FIG. 3 illustrates the principle of point image selection in the z and x directions in accordance with the first embodiment.

As shown in FIG. 3, the respective holograms 3-1, 3-2, . . . , 3-m are exposed so as to reproduce images 6-1, 6-2, . . . , 6-m of the point light sources at different positions in a z direction (or in the depth direction of the hologram) in the three-dimensional space when irradiated with light from one laser light source 1. More specifically, when the hologram 3-1 is irradiated with light from one laser light source 1, it produces a point image 6-1; . . . ; when the hologram 3-m is irradiated with light from one laser light source 1, it produces a point image 6-m. Thus, the coordinate in the z direction of the point image 6 can be selected by selecting a hologram which is irradiated with light by the rotation of the motor 4.

Since such exposed hologram is irradiated with the light from the light sources 1-1, 1-2, . . . , 1-n disposed in a straight line in the y direction, when one hologram, for example, 3-1, is irradiated with laser light while all the light sources 1-1, 1-2, . . . , 1-n are being turned on, a plurality of point images 6-1, 6-2, . . . , 6-m arranged in the y direction can be simultaneously reconstructed, as shown in FIG. 2. Thus, the coordinates of the point images 6-1, 6-2, . . . , 6-n in the y direction can be selected by selectively lighting the light sources 1-1, 1-2, . . . , 1-n.

When the hologram disc 3 is rotated within the range of rotational angle of one hologram while one light source is being turned on, the point images 6-1, 6-2, . . . , 6-m form corresponding circular arcs extending in the x direction in the three-dimensional space, as shown in FIG. 3. Thus, selection of the timing of lighting the light source 1 in accordance with the rotational angle of one hologram in the region of this hologram brings about selection of the coordinates of the point images 6-1, 6-2, . . . , 6-m in the x direction.

Figure 4:
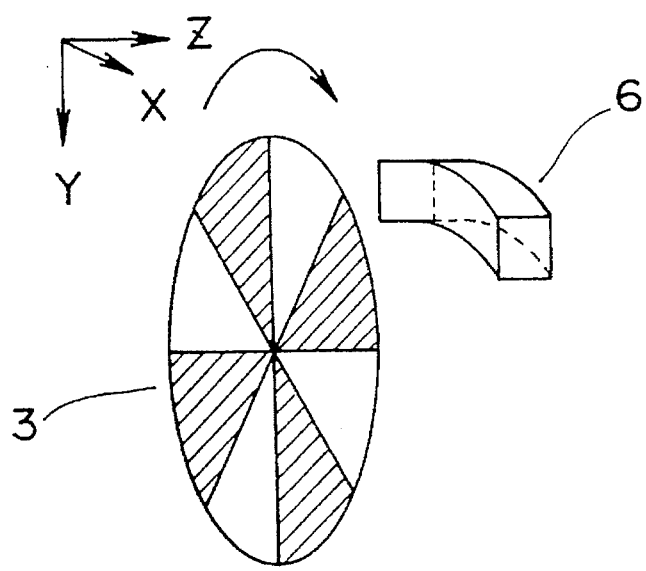
FIG. 4 shows a three-dimensional space of point images produced in accordance with the first embodiment.

That is, in the present embodiment, the control unit 5 controls the timing of lighting of the light source 1 in accordance with the rotational angle of the hologram disc so as to control the coordinates in the x direction, controls the lighting operations of the light sources arranged in the y direction so as to control the coordinates in the y direction, and controls selection of the respective holograms by the rotation of the motor 4 so as to control the coordinates in the z direction to thereby reconstruct the point images in the three-dimensional space 6 as shown in FIG. 4 in accordance with the image signal.

Figure 5:
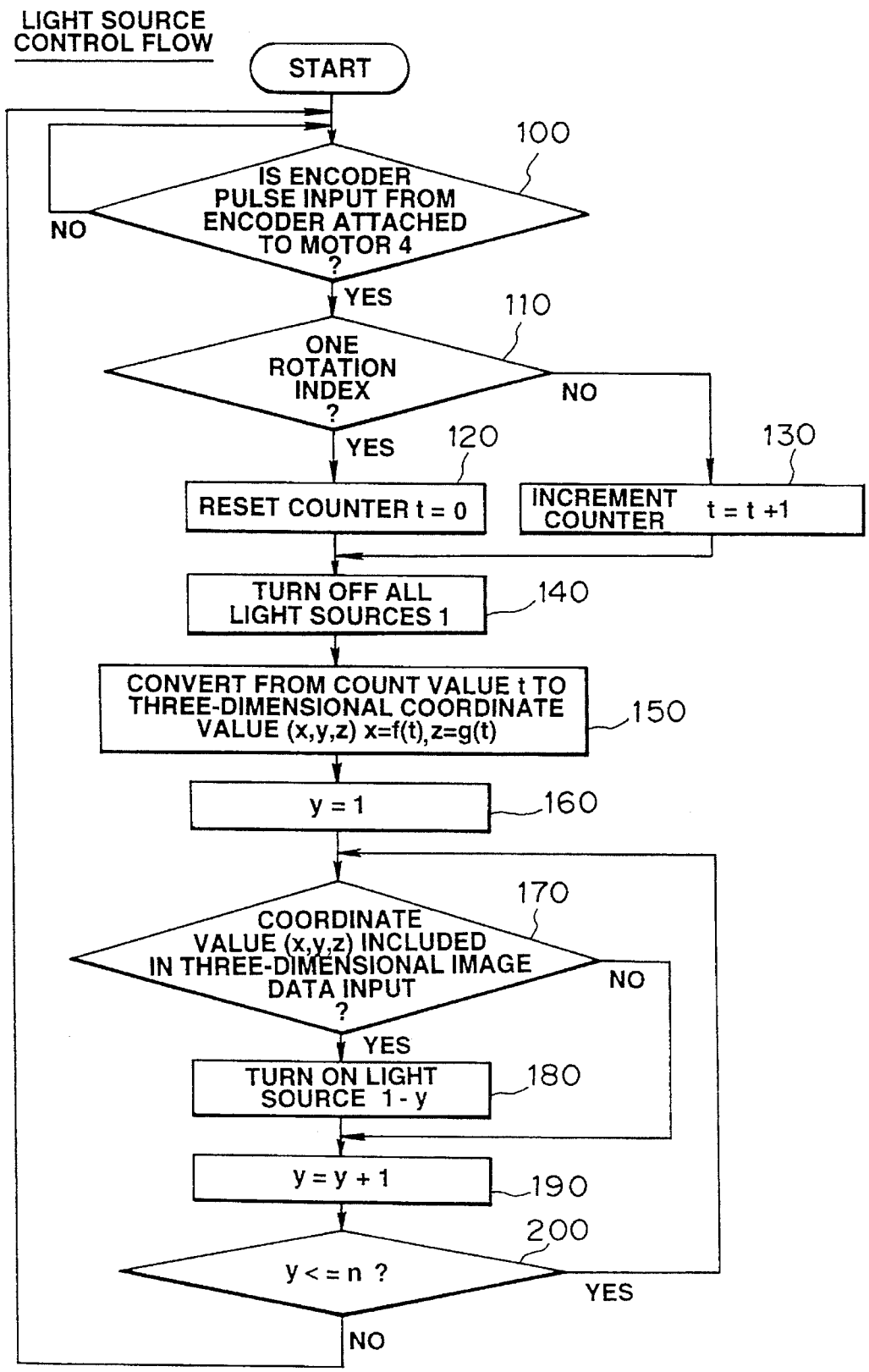
FIG. 5 is a flowchart indicative of the operation of the first embodiment.

FIG. 5 shows a specified example of control of lighting operation of the light irradiating unit 1 by the control unit 5.

When the control unit 5 receives an encoder pulse from an encoder attached to the motor 4 (step 100), it determines whether the received pulse is an index pulse which is output each time the hologram disc 3 makes a one complete rotation (step 110). If so, the control unit 5 resets at 0 the count t in a counter which counts the encoder pulse (step 120). If the received pulse is not the index pulse, but a normal encoder pulse, the control unit 5 increments the count t in the counter by one (step 130).

Then, the control unit 5 first turns off all the light sources 1-1, 1-2, . . . , 1-n in any one of those cases (140).

Next, the control unit 5 inserts the count t+1 into predetermined expressions x=f(t) and z=g(t) to calculate the x and z coordinates corresponding to that count value (step 150).

The control unit 5 initializes the y coordinate to y=1 (step 160) and then determines whether the three-dimensional coordinates (x, 1, z) calculated at steps 150 and 160 are included in the image signal D input this time (step 170). If so, the control unit 5 turns on the light source 1-y corresponding to the y coordinate (in this case, y=1)(step 180).

If the this-time-input image signal D is not included in the three-dimensional coordinates (x, 1, y), the control unit 5 increments the y coordinate by one (step 190) and again determines whether the three-dimensional coordinates (x, 2, z) is included in the image signal D input this time, using the y+1 coordinates (step 170) to thereby control the lighting operation of the light source in a manner similar to that mentioned above (step 180).

Until the y coordinate exceeds the number of light sources, n, (step 200), the control unit 5 increments the y coordinate by one to iterate the control of the lighting operation of the light sources by comparison of the image signal and the three-dimensional coordinates.

The three-dimensional display of a desired object corresponding to the image signal is achieved by execution of the series of the controlling operations within the after-image time of the viewer. A motion image can be obtained by moving the created image in each after-image time.

Figure 6:
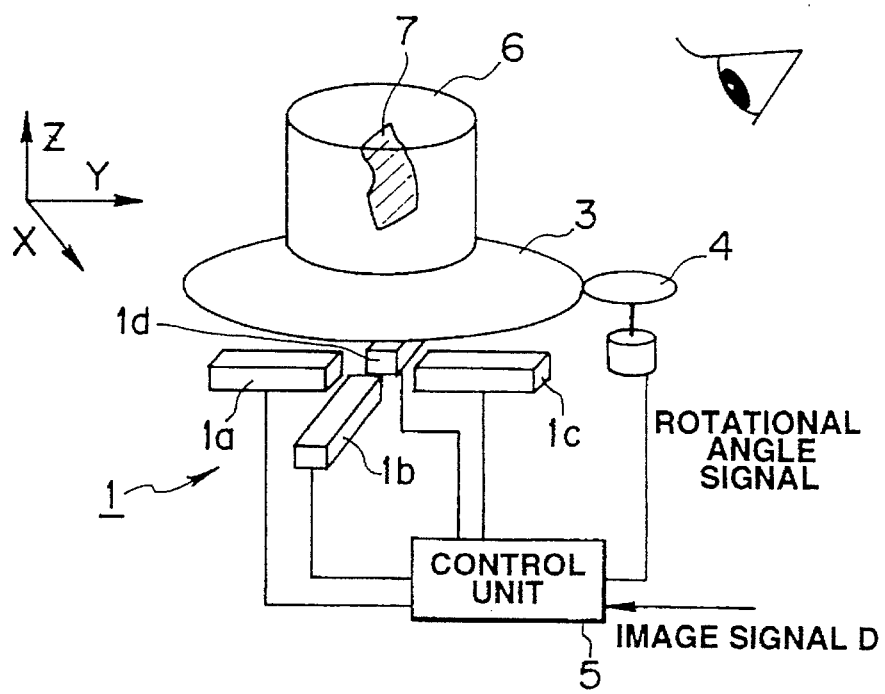
FIG. 6 shows a second embodiment of the present invention.

FIG. 6 shows a second embodiment of the invention which is composed of a plurality of light source modules 1a, 1b, 1c and 1d disposed radially; a hologram disc 3; a motor 4 which rotates the hologram disc 3 and a control unit 5.

Figure 7:
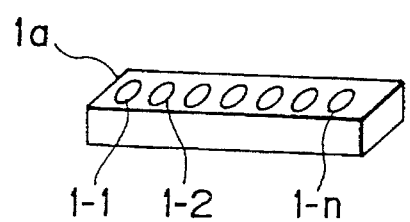
FIG. 7 shows the details of a light source module.

As shown in FIG. 7, each of the light source modules 1a, 1b, 1c and 1d has a plurality of light sources 1-1, 1-2, . . . , 1-n arranged in a straight line. The lighting operations of the light source modules 1a, 1b, 1c and 1d are separately controllable. The lighting operations of the light sources 1-1, 1-2, . . . , 1-n of each of the light source modules are also separately controllable. In this case, the light source modules 1a, 1c are arranged such that their light sources 1-1, 1-2, . . . , 1-n are arranged in the y direction while the light source modules 1b, 1d are arranged such that their light sources 1-1, 1-2, . . . , 1-n are arranged in the x direction.

Figure 8:
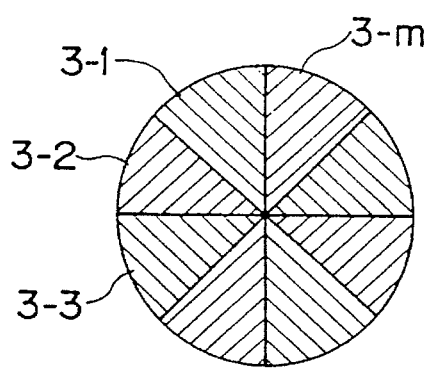
FIG. 8 shows a manner of dividing a hologram.
Figure 9:
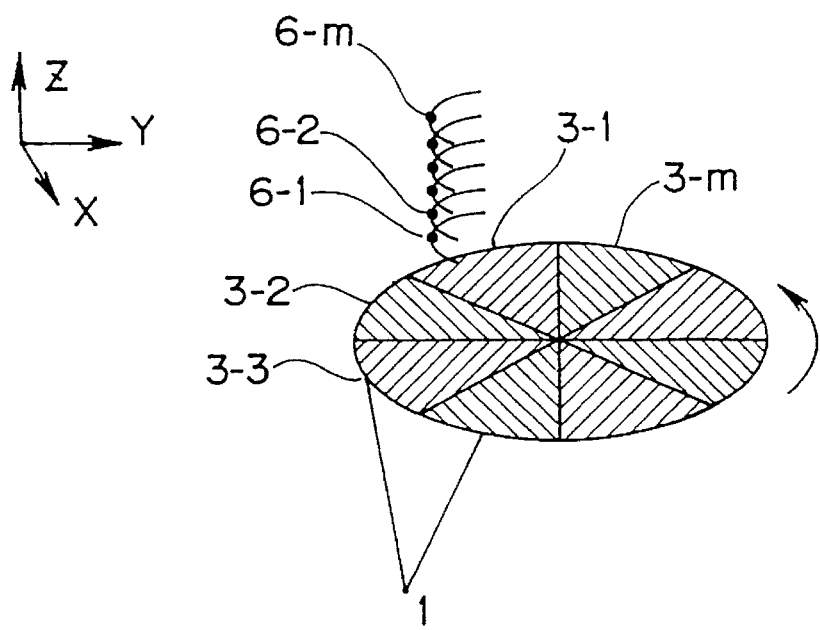
FIG. 9 illustrates the principle of point image selection in the z and x directions in accordance with the second embodiment.

As shown in FIG. 8, the disc-like hologram 3 disposed to face the radially disposed modules 1a–1d is divided into a plurality of fan-shaped areas 3-1, 3-2, . . . , 3-m. The respective hologram areas are already exposed such that when they are irradiated with light from one light source of one light source module, they reproduce images of point light sources 6-1, 6-2, . . . , 6-m at different positions in the z direction (in the depth direction of the hologram) of the three-dimensional space, as shown in FIG. 9. In this case, when the hologram 3-1 is irradiated with light from one light source, it reconstructs a point image 6-1; when the hologram 3-2 is irradiated with light from that light source, it reconstructs a point image 6-2; . . . ; and when the hologram 3-m is irradiated with light from that light source, it reconstructs a point image 6-m.

Figure 10:
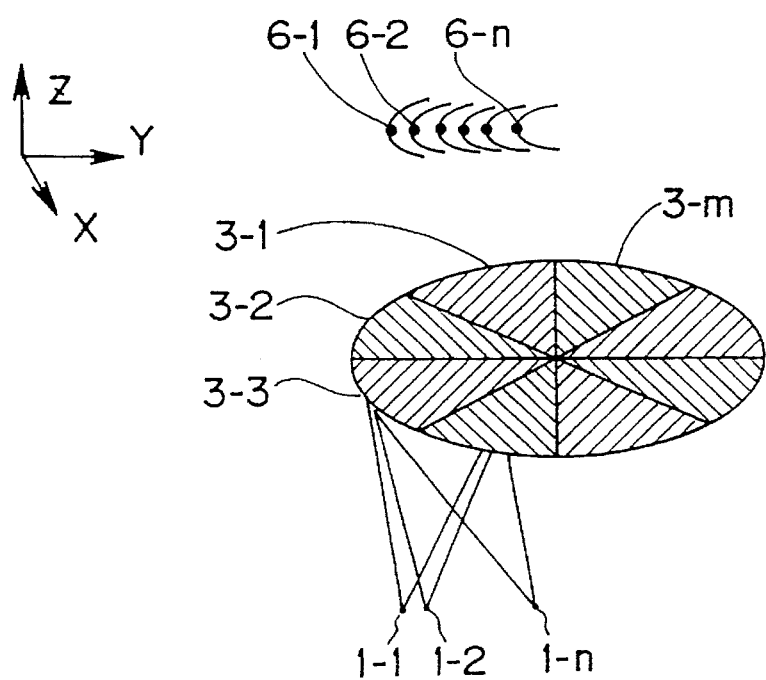
FIG. 10 illustrates the principle of point image selection in the y direction in accordance with the second embodiment.

Since the light source module 1a has the light sources 1-1, 1-2, . . . , 1-n arranged in the straight line in the y direction, point images 6-1, 6-2, . . . , 6-n arranged in the y direction can be reproduced simultaneously, as shown in FIG. 10, when one hologram, for example, designated by 3-1, is irradiated with laser light while all the light sources 1-1, 1-2, . . . , 1-n are being turned on. Although not shown, since the light source module 1b has the light sources 1-1, 1-2, . . . , 1-n disposed in the straight line in the x direction, point images 6-1, 6-2, . . . , 6-n arranged in the x direction are reproduced simultaneously when one hologram, for example, designated by 3-1, is irradiated with laser light while all the light sources 1-1, 1-2, . . . , 1-n of the light source module 1b are being turned on.

When the hologram disc 3 is rotated within a rotational angle range corresponding to one divided area while one light source is being turned on, the point images 6-1 to 6-m shown in FIG. 9 or the point images 6-1 to 6-n shown in FIG. 10 form circular arcs, as shown in FIGS. 9 and 10, respectively. Since FIG. 10 shows the point images arranged in the y direction in correspondence with the light source module 1a, the point images form circular arcs extending substantially in the x direction when the hologram disc 3 is rotated.

Figure 11:
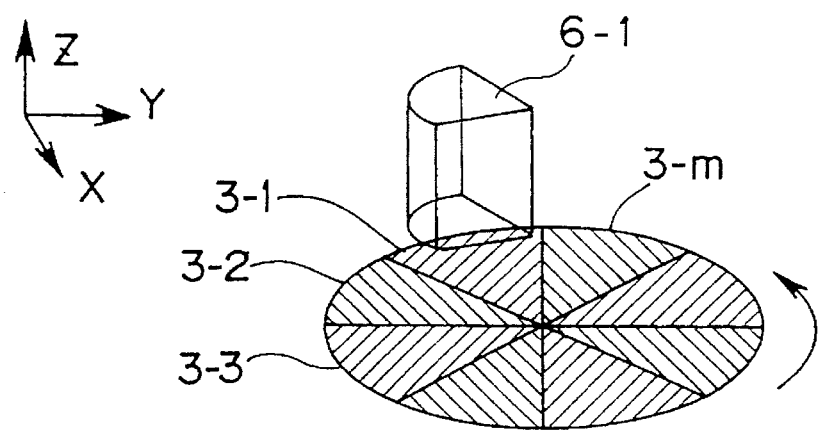
FIG. 11 shows a three-dimensional space of point images produced by one light source module of the second embodiment.

That is, control of the lighting operations of the light sources 1-1, 1-2, . . . , 1-n of one light source module and control of the rotation of the hologram disc 3 by the motor 4 bring about reconstruction of a plurality of point images arranged in the x, y and z directions in a columnar three-dimensional space 6 having fan-shaped upper and lower surfaces, as shown in FIG. 11, obtained by vertically dividing a column.

For example, when taking note of one light source module 1a, the coordinates in the x direction are controlled by controlling the timing of lighting of the respective light sources 1-1, 1-2, . . . , 1-n of the light source module 1a in accordance with the rotational angle of the hologram; the coordinates in the y direction are controlled by controlling the timing of lighting of the light sources 1-1, 1-2, . . . , 1-n arranged in the y direction; and the coordinates in the z direction are controlled by the selection of the plurality of divided areas 3-1, 3-2, . . . , 3-m by the rotation of the motor 4, whereby a plurality of point images in a columnar three-dimensional space 6-1 having fan-shaped upper and lower surfaces, as shown in FIG. 11, can be reproduced in accordance with the image signal.

When taking note of one of the light source module 1b having a plurality of light sources 1-1, 1-2, . . . , 1-n arranged in the x direction, the coordinates in the y direction are controlled by controlling the timing of lighting of the respective light sources 1-1, 1-2, . . . , 1-n of the light source module 1b in accordance with the rotational angle of the hologram; the coordinates in the x direction are controlled by controlling the timing of lighting of the light sources 1-1, 1-2, . . . , 1-n arranged in the x direction; and the coordinates in the z direction are controlled by the selection of the plurality of divided areas 3-1, 3-2, . . . , 3-m by the rotation of the motor 4, whereby a three-dimensional space having a plurality of point images and having the similar shape to the shortcake-like three-dimensional space 6-1 is formed at a position adjacent to the position of the three-dimensional space 6-1.

Figure 12:
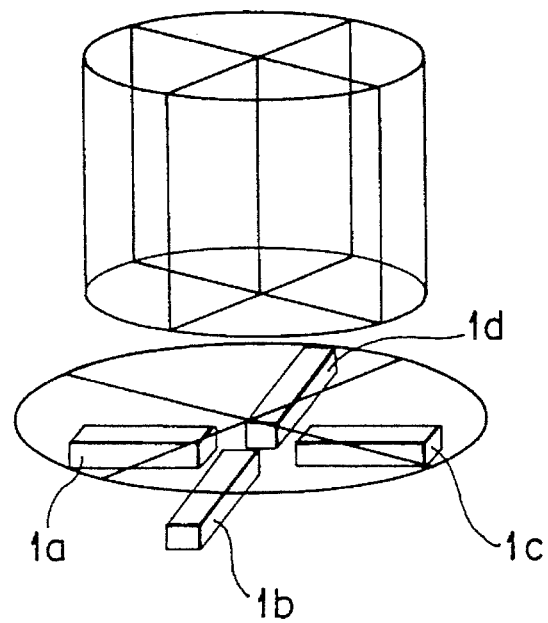
FIG. 12 shows a three-dimensional space of point images produced by the second embodiment.

Thus, by appropriate selection of the dividing manner of the hologram disc 3 and the number of light source module 1, a three-dimensional column-like point image space of combined shortcake-like image space sections one adjacent to another is formed on the opposite side of the light source modules with the hologram disc 3 being put in between, as shown in FIG. 12.

The control unit 5 provides light source control such as shown in the flowchart of FIG. 5 for a plurality of light source modules in a parallel manner to form a three-dimensional image 7 in the column-like three-dimensional point image space 6 in accordance with the image signal D, as shown in FIG. 6.

While in the embodiment the hologram disc 3 is illustrated as being a disc, the hologram may take any other shape. The manner of dividing the hologram, the number of divided holograms and the number of light source modules are optional and not limited to those of the embodiments.

What is claimed is:

1. A three-dimensional image display device comprising:

a holographic plate having a plurality of holograms divided in correspondence with rotational angles, the holographic plate being exposed so that when light is irradiated, each of the holograms forms a point image at a different position in a depth direction of the holographic plate;

drive means for rotating the holographic plate;

light irradiating means including a plurality of light sources arranged substantially in a straight line so that the light sources are kept at substantially equal distances from the holographic plate, for irradiating the holographic plate with light from the light sources; and control means for controlling lighting of a plurality of point images formed in a three-dimensional space in response to a three-dimensional image signal to be displayed, by controlling the drive means to irradiate the light from the light irradiating means to one of the holograms so as to select coordinates of point images in a depth direction of the hologram, by lighting one of the light sources to select coordinates of point images in a direction in which the light sources are juxtaposed, and by controlling the drive means to select a rotational angle within the respective holograms so as to select coordinates of point images in a direction perpendicular to the depth direction of the hologram and to the direction in which the light sources are juxtaposed.

2. The three-dimensional image display device according to claim 1, wherein the holographic plate includes a plurality of fan-shaped holograms being disposed radially.

3. The three-dimensional image display device according to claim 2, wherein the fan-shaped holograms are spaced apart from each other.

4. A three-dimensional image display device comprising:

a holographic plate having a plurality of holograms divided in correspondence with rotational angles, the holographic plate being exposed so that when light is irradiated, each of the holograms forms a point image at a different position in a depth direction of the hologram;

drive means for rotating the holographic plate;

light irradiating means including a plurality of light source modules arranged radially, each module including a plurality of light sources arranged substantially in a straight line so that the light sources are kept at substantially equal distances from the holographic plate, for irradiating the holographic plate with light from the light sources of each light source module; and control means for controlling lighting of a plurality of point images formed in a three-dimensional space in response to a three-dimensional image signal to be displayed, by controlling the drive means to irradiate the light from the light irradiating means to one of the holograms so as to select coordinates of point images in a depth direction of the hologram, by lighting one of the light sources of the light source module to select coordinates of point images in a direction in which the light sources of the light source module are juxtaposed, and by controlling the drive means to select a rotational angle within the respective holograms so as to select coordinates of point images in a direction perpendicular to the depth direction of the hologram and to the direction in which the light sources of the light source module are juxtaposed.

5. The three-dimensional image display device according to claim 4, wherein the holographic plate includes a plurality of fan-shaped holograms being disposed radially.

6. The three-dimensional image display device according to claim 5, wherein the fan-shaped holograms are spaced apart from each other.

* * * * *